(12) United States Patent
Dweik et al.

(10) Patent No.: US 7,324,329 B2
(45) Date of Patent: Jan. 29, 2008

(54) ELECTROCHEMICAL-ELECTROLYTIC CAPACITOR AND METHOD OF MAKING THE SAME

(75) Inventors: Badawi M. Dweik, Foxboro, MA (US); John W. Forchione, Ashland, MA (US); Mourad Manoukian, Watertown, MA (US); John A. Kosek, Danvers, MA (US); Anthony B. LaConti, Lynnfield, MA (US); David A. Evans, Seekonk, MA (US)

(73) Assignee: Giner, Inc., Newton, MA (US)

( * ) Notice: Subject to any disclaimer, the term of this patent is extended or adjusted under 35 U.S.C. 154(b) by 105 days.

(21) Appl. No.: 11/316,416

(22) Filed: Dec. 22, 2005

(65) Prior Publication Data

US 2007/0146971 A1 Jun. 28, 2007

(51) Int. Cl.
*H01G 9/00* (2006.01)
(52) U.S. Cl. .................. 361/523; 361/516; 361/519; 361/525; 361/528; 361/529; 29/25.01; 29/25.03; 252/62.2
(58) Field of Classification Search ............. 361/523, 361/525, 528, 529, 534, 536–540, 502, 503, 361/508–512, 516–519, 302–305; 29/25.01, 29/25.03; 252/62.2
See application file for complete search history.

(56) References Cited

U.S. PATENT DOCUMENTS

| | | | |
|---|---|---|---|
| 5,136,474 A | 8/1992 | Sarangapani et al. | |
| 5,369,547 A | 11/1994 | Evans | |
| 5,559,667 A | 9/1996 | Evans | |
| 5,795,496 A * | 8/1998 | Yen et al. .................. 252/62.2 | |
| 6,154,358 A * | 11/2000 | Fukaumi et al. ............ 361/523 | |
| 6,225,009 B1 * | 5/2001 | Fleischer et al. ............ 429/306 | |
| 6,300,015 B1 * | 10/2001 | Nishiyama et al. ......... 429/303 | |
| 6,464,846 B1 | 10/2002 | Titterington | |
| 6,500,319 B2 | 12/2002 | LaConti et al. | |
| 6,696,138 B2 * | 2/2004 | Sakai et al. ................. 428/209 | |

(Continued)

OTHER PUBLICATIONS

Evans, "The Littlest Big Capacitor—An Evans Hybrid," Proc. of the Fifth Int'l Seminar on Double Layer Capacitors and Similar Energy Storage Devices, Deerfield Beach, FL (1995).

(Continued)

*Primary Examiner*—Nguyen T. Ha
(74) *Attorney, Agent, or Firm*—Kriegsman & Kriegsman

(57) ABSTRACT

A high-voltage electrochemical-electrolytic capacitor. The capacitor includes a cathode comprising a plurality of electrically-conductive particles in intimate electrical contact with one another and disposed in a proton-conductive, electrically-non-conductive, solid ionomer matrix. The capacitor also includes an anode comprising a plurality of electrically-conductive particles in intimate electrical contact with one another and disposed in a proton-conductive, electrically-non-conductive solid ionomer matrix, the electrically-conductive particles of the anode differing in composition from the electrically-conductive particles of said cathode. The capacitor further includes a proton-conducting dielectric positioned between and in contact with each of the cathode and the anode, the proton-conducting dielectric comprising a solid ionomer. Preferably, the capacitor is assembled by constructing a first portion and a second portion, the first portion comprising the cathode and an extra thickness of solid ionomer on its inner surface, the second portion comprising the anode and an extra thickness of solid ionomer on its inner surface. When the first and second portions are brought together, the extended thicknesses of the solid ionomer jointly form the proton-conducting dielectric.

47 Claims, 6 Drawing Sheets

U.S. PATENT DOCUMENTS 6,838,210 B2 * 1/2005 Sawa .......................... 429/188
6,842,331 B1 * 1/2005 Kazaryan et al. ............ 361/502
6,999,303 B2 * 2/2006 Hasegawa ................... 361/523
7,035,084 B2 * 4/2006 Kaneko et al. .............. 361/508

OTHER PUBLICATIONS

Evans, "170 Volt Ta Hybrid Capacitor—Eng. Consid.," Proc. of the 7th Int'l Seminar on Double Layer Capacitors and Similar Energy Storage Devices, Deerfield Beach, FL (1997).

* cited by examiner

ELECTROCHEMICAL-ELECTROLYTIC CAPACITOR AND METHOD OF MAKING THE SAME

STATEMENT OF FEDERALLY SPONSORED RESEARCH

The U.S. Government has a paid-up license in this invention and the right in limited circumstances to require the patent owner to license others on reasonable terms as provided by the terms of Grant Numbers 1R43 HL066877-01 and 5R44 HL066877-03 awarded by NIH-SBIR.

BACKGROUND OF THE INVENTION

The present invention relates generally to capacitors and relates more particularly to electrochemical-electrolytic capacitors.

Capacitors are devices that store electrical charge. Capacitors typically include a pair of electrically conductive electrodes insulated from one another by a dielectric.

One type of capacitor is an electrochemical capacitor, an example of which is disclosed in U.S. Pat. No. 5,136,474, inventors Sarangapani et al., which issued Aug. 4, 1992, and which is incorporated herein by reference. The electrochemical capacitor of the aforementioned patent includes a proton-conducting dielectric in the form of a solid ionomer membrane. Said solid ionomer membrane is said to be preferably a perfluorocarbon sulfonic acid polymer, such as that formed by the copolymerization of polytetrafluoroethylene and a polyfluorovinyl ether containing pendant sulfonic acid groups. A first electrode is bonded to and is in intimate contact with a first surface of the solid ionomer membrane, and a second electrode is bonded to and is in intimate contact with a second surface of the solid ionomer membrane. Each of the first electrode and the second electrode is made up of $RuO_x$ (wherein x is approximately 2) particles that have been coated with a quantity of the solid ionomer, the ionomer-coated $RuO_x$ particles of each electrode being in intimate contact with one another in such a way that proton conductivity within each electrode is afforded by the ionomer coating and electron conductivity within each electrode is afforded by the $RuO_x$ particles. Because ionomer is continuously present in the first and second electrodes and in the dielectric, a continuous proton transport path exists between the two electrodes. On the other hand, a continuous electron transport path does not exist between the two electrode due to the presence of the dielectric; consequently, electrical charge is stored in the electrodes. The electrochemical capacitor also includes a pair of current collectors, one of the current collectors being bonded to the outside surface of the first electrode and in intimate contact with $RuO_x$ particles therein for electron conductivity therewith, the other current collector being bonded to the outside surface of the second electrode and in intimate contact with $RuO_x$ particles therein for electron conductivity therewith.

Another type of capacitor is an electrochemical-electrolytic capacitor, an example of which is disclosed in U.S. Pat. No. 5,369,547, inventor Evans, which issued Nov. 29, 1994, and which is incorporated herein by reference. The electrochemical-electrolytic capacitor of the aforementioned patent includes a metal container that functions as the cathode of the capacitor, the metal container having an inside surface and an outside surface. A porous coating including an oxide of a metal, which metal is selected from the group consisting of ruthenium, iridium, nickel, rhodium, platinum, palladium, and osmium, is formed on the inside surface of the metal container. Instead of forming the porous coating directly on the metal container, the porous coating may be formed on a metal foil disposed within the container and welded to the inside surface of the container. An anode, which is selected from the group consisting of tantalum, aluminum, niobium, zirconium, and titanium, is disposed within the container and is spaced from the porous coating by electrically insulating spacers. The anode is said to be preferably a conventional sintered porous tantalum anode of the type used in conventional wet slug tantalum capacitors. A liquid electrolyte, which is said to be most typically a sulfuric acid solution, is disposed within the container in contact with the porous coating and the anode.

Another example of an electrochemical-electrolytic capacitor is disclosed in U.S. Pat. No. 5,559,667, inventor Evans, which issued Sep. 24, 1996, and which is incorporated herein by reference. The electrochemical-electrolytic capacitor of the aforementioned patent is nearly identical to the electrochemical-electrolytic capacitor of the above-discussed U.S. Pat. No. 5,369,547, the only difference between the two capacitors being that, in the capacitor of U.S. Pat. No. 5,559,667, the liquid electrolyte of U.S. Pat. No. 5,369,547 is replaced with a solid electrolyte that is positioned between the porous coating and the anode. Materials said to be usable as the solid electrolyte are polypyrrole, NAFION® perfluorosulfonic acid (PFSA) polymer and polyaniline, as well as semi-solids, such as an aqueous electrolyte solution with silica added to form a gel.

Other publications relating to electrochemical-electrolytic capacitors include Evans, "The Littlest Big Capacitor—An Evans Hybrid," *Proceedings of The Fifth International Seminar on Double Layer Capacitors and Similar Energy Storage Devices*, Deerfield Beach, Fla. (1995) and Evans, "170 Volt Tantalum Hybrid Capacitor—Engineering Considerations," *Proceedings of The Seventh International Seminar on Double Layer Capacitors and Similar Energy Storage Devices*, Deerfield Beach, Fla. (1997), both of which are incorporated herein by reference.

SUMMARY OF THE INVENTION

It is an object of the present invention to provide a novel electrochemical-electrolytic capacitor and method of making the same.

Therefore, according to one aspect of the invention, there is provided an electrochemical-electrolytic capacitor, said electrochemical-electrolytic capacitor comprising (a) an electrochemical capacitor cathode, said electrochemical capacitor cathode comprising a plurality of electrically-conductive particles in intimate electrical contact with one another and disposed in a solid ionomer matrix, said solid ionomer matrix being proton-conductive and electrically-non-conductive; (b) an electrolytic capacitor anode, said electrolytic capacitor anode comprising a plurality of electrically-conductive particles in intimate electrical contact with one another and disposed in a solid ionomer matrix, said solid ionomer matrix being proton-conductive and electrically-non-conductive, said electrically-conductive particles of said electrolytic capacitor anode differing in composition from said electrically-conductive particles of said electrochemical capacitor cathode; and (c) a proton-conducting dielectric positioned between and in contact with each of said electrochemical capacitor cathode and said electrolytic capacitor anode, said proton-conducting dielectric comprising a solid ionomer.

The present invention is also directed to a method of preparing an electrochemical-electrolytic capacitor, said method comprising the steps of (a) preparing an electrochemical capacitor cathode-containing portion, said electrochemical capacitor cathode-containing portion comprising a plurality of electrically-conductive cathode particles in intimate electrical contact with one another and disposed in a first solid ionomer matrix, said first solid ionomer matrix being a proton-conductive, electrically-non-conductive, unitary structure, said first solid ionomer matrix having a volume that, on one side, extends beyond said electrically-conductive cathode particles and is devoid of said electrically-conductive cathode particles; (b) preparing an electrolytic capacitor anode-containing portion, said electrolytic capacitor anode-containing portion comprising a plurality of electrically-conductive anode particles in intimate electrical contact with one another and disposed in a second solid ionomer matrix, said second solid ionomer matrix being a proton-conductive, electrically-non-conductive, unitary structure, said electrically-conductive anode particles differing in composition from said electrically-conductive cathode particles, said second solid ionomer matrix having a volume that, on one side, extends beyond said electrically-conductive anode particles and is devoid of said electrically-conductive anode particles; and (c) then, bringing said electrochemical capacitor cathode-containing portion and said electrolytic capacitor anode-containing portion together (e.g., by joining) so that said volume of said first solid ionomer matrix and said volume of said second ionomer matrix together form a dielectric layer between said electrically-conductive cathode particles and said electrically-conductive anode particles.

The present invention is further directed to an electrochemical-electrolytic capacitor stack, said electrochemical-electrolytic capacitor stack comprising (a) a first current collector; (b) a first electrochemical capacitor cathode, said first electrochemical capacitor cathode comprising a plurality of electrically-conductive particles in intimate electrical contact with one another and with said first current collector, said electrically-conductive particles of said first electrochemical capacitor cathode being disposed in a solid ionomer matrix, said solid ionomer matrix of said first electrochemical capacitor cathode being proton-conductive and electrically-non-conductive; (c) a second current collector, said second current collector having a first surface and a second surface; (d) a first electrolytic capacitor anode, said first electrolytic capacitor anode comprising a plurality of electrically-conductive particles in intimate electrical contact with one another and with said first surface of said second current collector, said electrically-conductive particles of said first electrolytic capacitor anode being disposed in a solid ionomer matrix, said solid ionomer matrix of said first electrolytic capacitor anode being proton-conductive and electrically-non-conductive, said electrically-conductive particles of said first electrolytic capacitor anode differing in composition from said electrically-conductive particles of said first electrochemical capacitor cathode; (e) a first proton-conducting dielectric, said first proton-conducting dielectric being positioned between and in contact with each of said first electrochemical capacitor cathode and said first electrolytic capacitor anode, said first proton-conducting dielectric comprising a solid ionomer; (f) a second electrochemical capacitor cathode, said second electrochemical capacitor cathode comprising a plurality of electrically-conductive particles in intimate electrical contact with one another and with said second current collector, said electrically-conductive particles of said second electrochemical capacitor cathode being disposed in a solid ionomer matrix, said solid ionomer matrix of said second electrochemical capacitor cathode being proton-conductive and electrically-non-conductive; (g) a third current collector; (h) a second electrolytic capacitor anode, said second electrolytic capacitor anode comprising a plurality of electrically-conductive particles in intimate electrical contact with one another and with said third current collector, said electrically-conductive particles of said second electrolytic capacitor anode being disposed in a solid ionomer matrix, said solid ionomer matrix of said second electrolytic capacitor anode being proton-conductive and electrically-non-conductive, said electrically-conductive particles of said second electrolytic capacitor anode differing in composition from said electrically-conductive particles of said second electrochemical capacitor cathode; and (i) a second proton-conducting dielectric, said second proton-conducting dielectric being positioned between and in contact with each of said second electrochemical capacitor cathode and said second electrolytic capacitor anode, said second proton-conducting dielectric comprising a solid ionomer.

For purposes of the present specification and claims, it is to be understood that certain relational terms used herein, such as "above," "below," "top," "bottom," "over," "under," "in front of," or "behind," when used to denote the relative positions of two or more components of a device, are used to denote such relative positions in a particular orientation and that, in a different orientation, the relationship of said components may be reversed or otherwise altered.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF PREFERRED EMBODIMENTS

Figure 1:
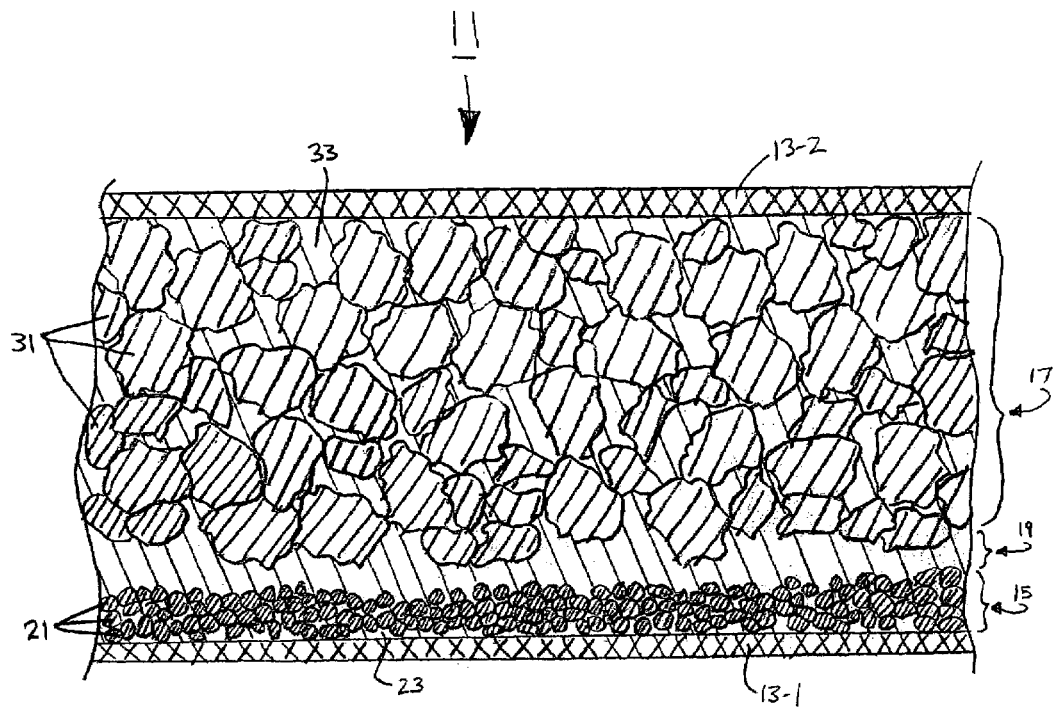
FIG. 1 is a fragmentary schematic section view of a first embodiment of an electrochemical-electrolytic capacitor constructed according to the teachings of the present invention.

Referring now to FIG. 1, there is shown a schematic section view of a first embodiment of an electrochemical-electrolytic capacitor constructed according to the teachings of the present invention, said electrochemical-electrolytic capacitor being represented generally by reference numeral 11.

Capacitor 11, which is a high-voltage electrochemical-electrolytic capacitor, comprises a pair of current collectors 13-1 and 13-2, an electrochemical capacitor cathode (i.e., an electrochemical capacitor negative electrode) 15, an electrolytic capacitor anode (i.e., an electrolytic capacitor positive electrode) 17, and a proton-conducting dielectric 19.

Current collectors 13-1 and 13-2, which may be either identical to one another or different from one another, are thin electrically-conductive films that provide structural support and electrical current collection. Collectors 13-1 and 13-2 are preferably foils of valve metals including, but not being limited to, tantalum, niobium, titanium, hafnium, zirconium and vanadium. Collector 13-1 may be coated or embedded with a thin or non-oxidized noble metal (e.g., platinum, palladium), and collector 13-2 may be coated on its inner surface with a very thin layer of a valve metal oxide (e.g., tantalum oxide, niobium oxide, titanium oxide, hafnium oxide, zirconium oxide or vanadium oxide), or mixtures and alloys of valve metal oxides (e.g., tantalum-niobium oxide, tantalum-hafnium oxide, and the like) to improve surface contact resistance to the corresponding electrode secured thereto.

Figure 2:
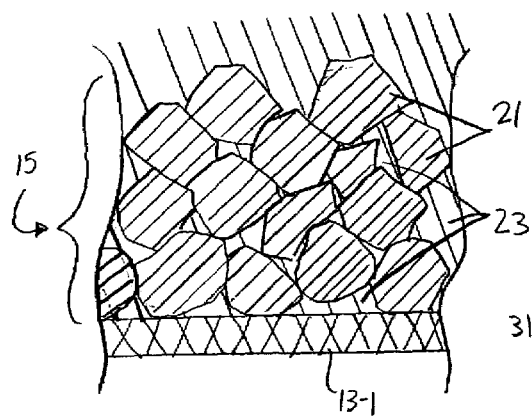
FIG. 2 is an enlarged fragmentary view of the cathode of FIG. 1.

Cathode 15, which is also shown in an enlarged fragmentary view in FIG. 2, is bonded to current collector 13-1 and proton-conducting dielectric 19 and comprises a plurality of electrically-conductive particles 21 embedded in a proton-conductive, electrically-non-conductive, solid ionomer matrix 23. Particles 21 are preferably aggregated in a plurality of layers, as opposed to being spread out in a monolayer, and are positioned relative to one another and relative to current collector 13-1 so as to be in intimate electrical contact with one another and with current collector 13-1. Particles 21 preferably are made of a metal oxide and more preferably are made of a noble metal oxide, such as ruthenium oxide, iridium oxide, rhodium oxide and osmium oxide, or an alloyed or admixed noble metal oxide, such as ruthenium-rhodium oxide and ruthenium-iridium oxide, or an alloyed or admixed noble metal-valve metal oxide, such as ruthenium-tantalum oxide, iridium-tantalum oxide, and ruthenium-iridium-tantalum oxide. In a preferred embodiment, particles 21 are made of ruthenium oxide. Such ruthenium oxide particles may have an amorphous or rutile configuration, with an amorphous configuration being preferred to enhance conductivity, capacitance, and durability.

Alternatively, particles 21 may be made of a non-noble metal oxide, such as manganese dioxide, tungsten oxide, molybdenum oxide, tin oxide, antimony oxide or mixtures thereof, or may be made of one or more metal silicides, metal borides, metal nitrides and metal carbides, especially where the active metal component is manganese or another transition metal, such as tungsten, molybdenum or tin.

In addition, to increase electrical conductivity, to enhance performance and to reduce cost, particles 21 may be directly deposited as highly dispersed particles (e.g., 1 to 50 micrometers) or deposited onto high surface area, electrically conductive extenders, such as carbon, graphite, and boron carbide, tantalum carbide, and titanium carbide to yield dispersed particles (e.g., 0.05 to 1 micrometer).

Solid ionomer matrix 23, which coats the external surfaces of particles 21, fills the internal pores (not shown) of particles 21, and fills the interstices between neighboring particles 21 and between particles 21 and current collector 13-1 to provide a continuous proton transport path within cathode 15, preferably comprises a solid, albeit preferably hydrated, non-perfluorinated sulfonated ionomer. Solid ionomer matrix 23 is preferably formed by dissolving said non-perfluorinated sulfonated ionomer in alcohol or another suitable solvent that completely solubilizes the solid ionomer. Said ionomer solution is then deposited in and over particles 21, and the solvent component is thereafter dried off to yield matrix 23. Techniques for depositing the ionomer solution over particles 21 and current collector 13-1 include vacuum, pressure, wicking, immersion and spraying. One advantage of using a completely solubilized ionomer, as opposed to an ionomer dispersion, is that an ionomer solution permits a more complete penetration and filling of particle pores and small interstices between particles. Examples of solvent-soluble non-perfluorinated sulfonated ionomers that may be used to form matrix 23 include sulfonated-2,6-dimethyl polyphenylene oxide; sulfonated- (or phosphonated-)2,6-diphenyl polyphenylene oxide; polysulfone; polyethersulfone; polybenzimidazole; polyimide; polystyrene; polyethylene; polytrifluorostyrene; polyetheretherketone (PEEK) and liquid crystal polymers (e.g., Vexar, PBO). In a preferred embodiment, said solid ionomer is sulfonated-2,6-dimethyl polyphenylene oxide.

Alternatively, instead of using a non-perfluorinated sulfonated ionomer solution to form matrix 23, one may use a solution of a perfluorocarbon sulfonic acid (PFSA) ionomer of the type that typically forms a highly dispersed ionomer in solvents like water or alcohol, provided that the solvent system is formulated to maximize solubility and the resulting ionomeric solution concentrations are adjusted to wet and to thoroughly penetrate the particulate electrode structure. An example of such a perfluorocarbon sulfonic acid ionomer is NAFION® PFSA polymer (DuPont, Wilmington, Del.).

It should be noted that cathode 15 may alternatively be formed by dispersing particles 21 in a solid ionomer solution to form a paint, said paint thereafter being applied in one or more coatings to collector 13-1. Alternatively, cathode 15 may be formed by dispersing particles 21 in a solid ionomer solution to form a paint, said paint thereafter being applied in one or more coatings to proton-conductive dielectric 19, with the resultant cathode 15/dielectric 19 then being intimately bonded or contacted with collector 13-1.

Figure 3:
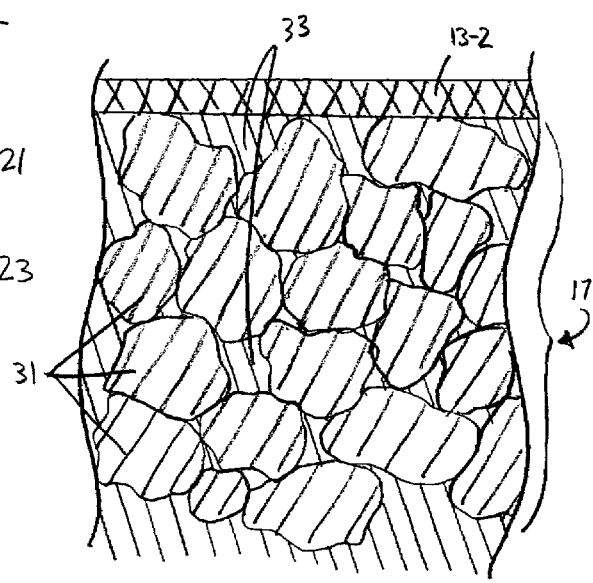
FIG. 3 is an enlarged fragmentary view of the anode of FIG. 1.

Anode 17, which is also shown in an enlarged fragmentary view in FIG. 3, is bonded or welded to current collector 13-2 and comprises a plurality of electrically-conductive particles 31 embedded in a proton-conductive, electrically-non-conductive, solid ionomer matrix 33. Each of particles 31 preferably comprises an inner core and an outer coating, the inner core preferably comprising a valve metal, such as tantalum, niobium, titanium, hafnium, zirconium and vanadium, the outer coating preferably comprising a corresponding valve metal oxide. In a preferred embodiment, particles 31 have an inner core of tantalum and an outer coating of tantalum oxide.

Preferably, particles 31 are formed by taking a valve metal in powdered, particulate or paste form and pressing the powder, particulate or paste (e.g., in a pressing mold at approximately 2500 psi to 3500 psi) to produce a porous pellet. If desired, one or more pore formers, such as ammonium hydrogen carbonate, urea, or polymethylmethacrylate, may be added to the powder, particulate or paste prior to formation of the pellet, such pore formers decomposing during pellet formation or sintering to provide a controlled pore size and configuration. (Alternatively, water or acid soluble particulate powders, such as sodium carbonate, sodium sulfate and boric acid, may be used as pore formers, such pore formers being leached subsequent to pelleting or sintering.) The pellet is then sintered at a high temperature (e.g., at approximately 1000° C. to 2000° C.) in a vacuum oven to fuse the particles together, without eliminating the pores between neighboring particles. The sintered pellet is then electrochemically activated in an acid solution at high anodic potentials (e.g., 100 V to 300 V). This is preferably done by subjecting the pellet to electrochemical acid treatment, for example, by dipping the pellet in a phosphoric acid solution, to produce a sintered pellet made up of particles having an outer coating of the electrochemically-formed valve metal oxide. Particles 31 are preferably aggregated in a plurality of layers in the pellet, as opposed to being spread out in a monolayer, and are positioned relative to one another and relative to current collector 13-2 so as to be in intimate electrical contact with one another and with current collector 13-2.

Particles 31 are preferably pressed with, sintered to or welded to and electrochemically activated with current collector 13-2. During the pressing/bonding or sintering and activation steps used to form the oxide surface for the tantalum welding, particles 31 on the bottom side of collector 13-2, the top side of collector 13-2 may be initially coated or embedded with a thin layer of noble metal to minimize oxide formation.

Solid ionomer matrix 33, which coats the external surfaces of particles 31, fills the internal pores (not shown) of particles 31, and fills the interstices between neighboring particles 31 and between particles 31 and current collector 13-2 to provide a continuous proton transport path within anode 17, preferably comprises a solid, albeit preferably hydrated, non-perfluorinated sulfonated ionomer. Solid ionomer matrix 33 is preferably formed by dissolving said non-perfluorinated sulfonated ionomer in alcohol or another suitable solvent that completely solubilizes the solid ionomer. Said ionomer solution is then deposited in and over particles 31, and the solvent component is thereafter dried off to yield matrix 33. Techniques for depositing the ionomer solution over particles 31 and current collector 13-2 include vacuum, pressure, wicking, immersion and spraying. One advantage of using a completely solubilized ionomer, as opposed to an ionomer dispersion, is that an ionomer solution permits a more complete penetration and filling of particle pores and small interstices between particles. This is particularly advantageous in the present invention since the porous particulate structure of the oxidized sintered pellet is very difficult to wet, penetrate and coat. Examples of solvent-soluble non-perfluorinated sulfonated ionomers that may be used to form matrix 33 include sulfonated-2,6-dimethyl polyphenylene oxide; sulfonated- (or phosphonated-)2,6-diphenyl polyphenylene oxide; polysulfone; polyethersulfone; polybenzimidazole; polyimide; polystyrene; polyethylene; polytrifluorostyrene; polyetheretherketone (PEEK) and liquid crystal polymers (e.g., Vexar, PBO). In a preferred embodiment, said solid ionomer is sulfonated-2,6-dimethyl polyphenylene oxide.

Alternatively, instead of using a non-perfluorinated sulfonated ionomer solution to form matrix 33, one may use a solution of a perfluorocarbon sulfonic acid ionomer of the type that typically forms a highly dispersed ionomer in solvents like water or alcohol, provided that the solvent system is formulated to maximize solubility and the resulting ionomeric solution concentrations are adjusted to wet and to thoroughly penetrate the particulate electrode structure. An example of such a perfluorocarbon sulfonic acid ionomer is NAFION® PFSA polymer (DuPont, Wilmington, Del.).

It should be noted that, during the initial formation of anode 17 (e.g., pressing/thermal sintering), the porous pellet may be sintered or welded to current collector 13-2.

Proton-conducting dielectric 19 preferably comprises a solid non-perfluorinated sulfonated ionomer of the type described above in connection with matrices 23 and 33 or a perfluorocarbon sulfonic acid ionomer of the type described above in connection with matrices 23 and 33. In fact, dielectric 19 is preferably formed by coating, during electrode production, an additional thickness of the same solid ionomer used to make matrices 23 and 33 onto the inner surfaces of cathode 15 and anode 17, respectively, and then pressing together or joining these additional thicknesses of solid ionomer to form dielectric 19. (Adhesion between these two portions of dielectric 19 may be promoted by applying a small amount of ionomer solution to one or both of the surfaces to be joined together, the ionomer solution having a tackiness when wet.) In view of the above, matrices 23 and 33 are preferably physically and chemically compatible with one another and, in many instances, preferably constitute the same material.

As can be appreciated from the above discussion, capacitor 11 is completely free of liquid electrolyte. This is a significant advantage over capacitors like that disclosed in U.S. Pat. No. 5,369,547 that rely on liquid electrolytes like sulfuric acid. Because sulfuric acid is highly corrosive, the types of materials that may be used to form the collector/anode of such a capacitor or to be used as enclosure for the same are limited to materials like tantalum, which can withstand well the corrosive effects of sulfuric acid. In addition, the use of such a liquid electrolyte requires the capacitor to be sealed well (e.g., hermetic seal) so as to prevent the leakage of the liquid electrolyte. Moreover, if one wishes to connect a plurality of such capacitors in series, one must first package and seal each capacitor individually.

In addition, in contrast with electrochemical-electrolytic capacitors in which only the inner surfaces of the anode and cathode are in contact with a solid ionomer, the solid ionomer of capacitor 11 pervades the entireties of both electrode structures, thereby resulting in a much higher capacitance and energy density. For example, capacitor 11 can readily achieve a high energy density of 4 joules/cm$^3$.

It should be understood that, although polymeric sulfonic acids, hydrated with water, and polymeric phosphonic acids, hydrated with water, are preferred solid ionomers for the capacitor of the present invention, there may be instances where a wider operating temperature range (e.g., down to −55 C and up to 80 C) may be required. Examples of solid additives that can be added to the ionomer coating solution to extend the operating temperature range include silicon oxides, zirconium oxides, zirconium phosphate, tantalum phosphate, tungsten phosphate, and molybdenum phosphate. Examples of additives that can be added to the water to extend the operating temperature range include ethylene glycol, propylene glycol, propylene glycol ethers, polypyrolles, dimethylacetamide, propylene carbonate, and butylene carbonate. Also, in some instances, little or no water may be required with the additives to achieve proton transport.

In addition, in instances where very high capacitance, high energy density, low equivalent resistance and rapid response over a broad frequency range are required, the capacitor of the present invention may be modified with the above, along with immobilized acids including phosphoric acid, trifluorosulfonic acid, or perfluorooctosulfonic acid, combined with ionomers, silica gels or silica carbide gels.

A plurality of capacitors 11 can be electrically connected in series, in parallel or in a combination of series and parallel.

Figure 4:
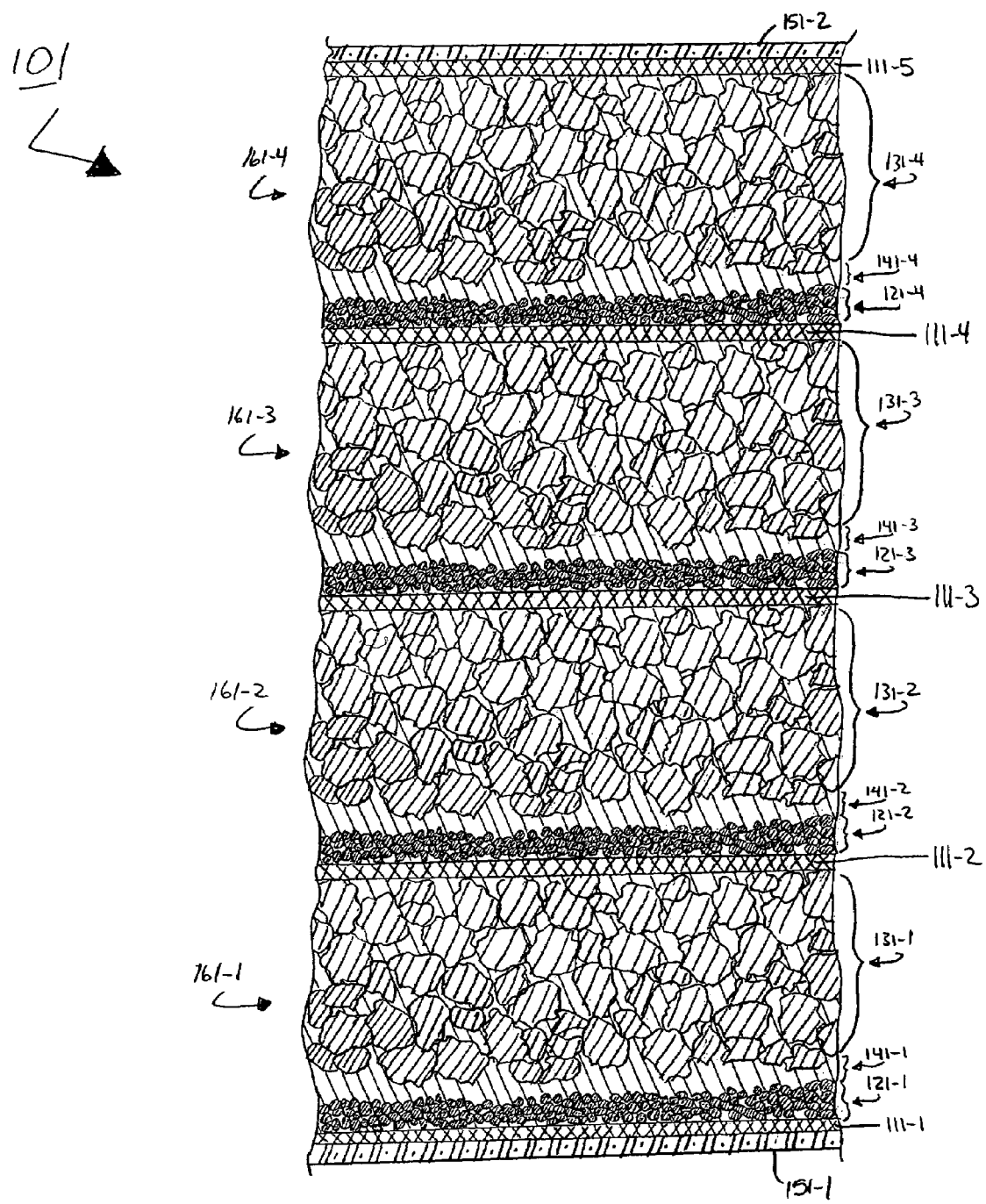
FIG. 4 is a schematic section view of a second embodiment of an electrochemical-electrolytic capacitor constructed according to the teachings of the present invention.

Referring now to FIG. 4, there is shown a schematic section view of a second embodiment of a electrochemical-electrolytic capacitor constructed according to the teachings of the present invention, said electrochemical-electrolytic capacitor being represented generally by reference numeral 101.

Capacitor 101, which is a high-voltage electrochemical-electrolytic capacitor, comprises a plurality of current collectors 111-1 through 111-5, a plurality of electrochemical cathodes 121-1 through 121-4, a plurality of electrolytic anodes 131-1 through 131-4, a plurality of proton-conducting dielectrics 141-1 through 141-4, and a pair of terminal seal plates 151-1 and 151-2.

Current collectors 111-1 through 111-5, which are thin, electrically-conductive films that provide structural support and electrical current collection, are preferably foils of valve metals including, but not being limited to, tantalum, niobium, titanium, hafnium, zirconium and vanadium. Collectors 111-1, 111-2, 111-3, 111-4 and 111-5 are preferably coated on their respective top surfaces with a very thin layer of a noble metal (e.g., platinum, palladium, ruthenium, iridium, rhodium, osmium, and the like), a noble metal oxide (e.g., ruthenium oxide, iridium oxide, rhodium oxide, osmium oxide, and the like), or a noble metal/valve metal oxide (e.g., ruthenium-tantalum oxide, ruthenium-iridium-tantalum oxide, and the like) to improve surface contact resistance to the corresponding electrode secured or bonded thereto. For example, in a preferred embodiment, current collector 111-1 is a tantalum foil, and each of current collectors 111-2 through 111-5 is a tantalum foil having a pressed/thermally sintered and electrochemically formed tantalum oxide coating on its bottom surface. (Where the oxide coating on the bottom surface of collectors 111-2 through 111-5 is formed by a process that also results in the formation of an oxide coating on the top surface of collectors 111-2 through 111-5, said oxide coating on the top surface may be removed (e.g., by abrading, machining, chemical or radiation (i.e., laser, electron beam) etching) to yield an oxide-free surface. Alternatively, the top surfaces of collectors 111-2 through 111-5 may be coated or embedded with a noble metal (e.g., platinum, palladium), prior to the pressing/thermally sintering and electrochemically activating step, to minimize oxide formation and to eliminate the need for the oxide removal step. To avoid oxide formation on the top surfaces of collectors 111-2 through 111-5 during the tantalum oxide sinter (bonded to the bottom surface of the collectors) electrochemical activation step at very high voltages (i.e., 100-300 V), the top surfaces of collectors 111-2 through 111-5 are covered or masked using plating tape (e.g., McMaster-Carr, NJ, Catalogue No. 76095A128) or solvent castable polymer film coatings used for electroplating (e.g., Special Masking, Eastlake, Ohio, Catalog No. XL88).

Cathodes 121-1 through 121-4, each of which is preferably identical to cathode 15 of capacitor 11, are bonded, welded or otherwise secured to the respective top surfaces of current collectors 111-1 through 111-4. Anodes 131-1 through 131-4, each of which is preferably identical to anode 17 of capacitor 11, are bonded, welded or otherwise secured to the respective bottom surfaces of current collectors 111-2 through 111-5. Dielectrics 141-1 through 141-4, each of which is preferably identical to and formed in the same manner as dielectric 19 of capacitor 11, are positioned between corresponding pairs of cathodes 121-1 through 121-4 and anodes 131-1 through 131-4.

In view of the above, it can be seen that capacitor 101 is in the form of a four-cell bipolar stack, with collector 111-1, cathode 121-1, dielectric 141-1, anode 131-1 and collector 111-2 forming a first cell 161-1, with collector 111-2, cathode 121-2, dielectric 141-2, anode 131-2 and collector 111-3 forming a second cell 161-2, with collector 111-3, cathode 121-3, dielectric 141-3, anode 131-3 and collector 111-4 forming a third cell 161-3, and with collector 111-4, cathode 121-4, dielectric 141-4, anode 131-4 and collector 111-5 forming a fourth cell 161-4. Cells 161-1 through 161-4 are sandwiched between terminal seal plates 151-1 and 151-2, which are electrically conductive members in intimate electrical contact with collectors 111-1 and 111-5, respectively. Plates 151-1 and 151-2 may include a compliance member (i.e., an electrically-conductive, pressure-compensation device to bring the capacitor components into intimate contact) (e.g., U.S. Pat. Nos. 6,500,319 and 6,464,846, both of which are incorporated herein by reference).

It should be understood that capacitor 101 need not have four cells 161-1 through 161-4, but rather, may be modified to include as few as two cells or more than four cells.

It should also be understood that each of the cells of capacitor 101 may alternatively be made by forming an anode-containing structure comprising a top foil collector that is intimately bonded or welded to a pressed/thermally sintered and subsequently electrochemically activated and ionomer coated anode having an extended dielectric ionomer layer. A metal oxide/ionomer cathode structure comprising preferably 70 to 95% metal oxide and 30 to 5% ionomer is then bonded (thermal or solvent bonded) to the extended dielectric ionomer layer. The resulting structure then makes intimate contact with the top surface of a collector from an adjacent cell.

In another embodiment (not shown), the pressed/thermally formed and electrochemically activated tantalum oxide sinter may be used as a combined electrode/bipolar cell element. The sinter may have a bottom porous section comprising solid ionomer-coated tantalum oxide particulate and a top nonporous section. The surface oxide layer on the top nonporous tantalum section of the sinter may be removed to form an oxide-free surface by abrading, machining, chemical etching or radiation (i.e., laser, electron beam)

etching. Alternatively, the top surface of the nonporous sinter section may be coated or embedded with a noble metal prior to the pressed/thermally sintered and electrochemically activated step to minimize oxide formation and to eliminate the oxide removal step. Masking of the top nonporous surface prior to the electrochemical activation step is preferably performed. A solid ionomer-coated ruthenium oxide particulate layer may be formed on the oxide-free top nonporous tantalum sinter surface.

In still another embodiment (not shown), all of the elements of the present capacitor may be packaged in alternative high-energy density configurations including spiral wound, tubular, fiber or on a solid-state chip, depending on the application.

All of the above-described embodiments involve the use of a proton-conducting or cationic solid ionomer. In an alternative embodiment, one could replace the cationic solid ionomer with an anionic solid ionomer, including an anion exchange ionomer in the hydroxide ion form (e.g., Ionics, Watertown, Mass., Catalog No. AR103-QDP). In such a case, the anode could be made using, for example, aluminum oxide particles, and the cathode could be made using, for example, nickel oxide particles, the aluminum oxide and nickel oxide particles being coated with a solvent soluble anion exchange ionomer, such as the quarternary ammonium form of styrene or polyphenylene oxide.

The following examples are provided for illustrative purposes only and are in no way intended to limit the scope of the present invention:

EXAMPLE 1

Figure 5:
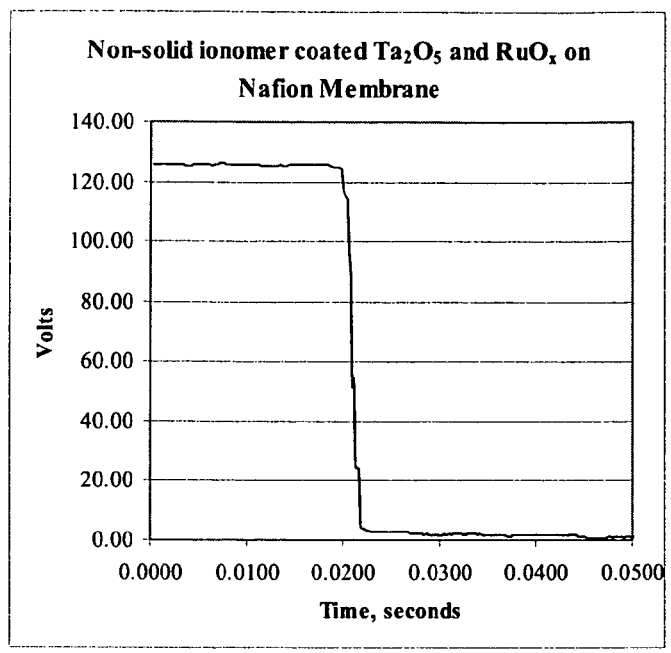
FIG. 5 is a graph representing the discharge curve for the electrochemical-electrolytic capacitor of Example 1.

An electrochemical-electrolytic capacitor of the type described below was fabricated and tested. In this electrochemical-electrolytic capacitor, the cathode was made of ruthenium oxide, the anode was made of tantalum oxide, and the solid electrolyte consisted of a NAFION® PFSA membrane. More specifically, the anode was formed in the following manner: tantalum powder (H.C. Starck NA30KN) was pressed into a pellet at a pressure of approximately 3000 psi. The pellet was then heated at a temperature of 1550° C. for 20 minutes under vacuum conditions to fuse the tantalum particles together to form a porous disk. The porous disk was then placed in a solution of 50% ethylene glycol and 0.1% $H_3PO_4$ and anodized at 150V for 24 hours at 85° C. to form a $Ta_2O_5$ coating on the tantalum particles. The thus-prepared disk was then pressed onto one side of a NAFION® PFSA membrane and the ruthenium oxide cathode was pressed onto the other side of the NAFION® PFSA membrane. The two electrodes and the NAFION® PFSA membrane were then placed between titanium sheet current collector frames. The capacitance of the thus-assembled capacitor was then evaluated by charging the capacitor to 125 volts and discharging across a 48 ohm load while recording the discharge potential vs. time. The resulting discharge curve is shown in FIG. 5. The measured capacitance was 2 microFarads/cm², which is extremely low.

EXAMPLE 2

A second electrochemical-electrolytic capacitor was constructed, this second electrochemical-electrolytic capacitor differing from the electrochemical-electrolytic capacitor of Example 1 primarily in that a different cathode was used. More specifically, in this second electrochemical-electrolytic capacitor, the cathode was made as in U.S. Pat. No. 5,136,474 by coating high-surface-area $RuO_2$ particles with a liquid NAFION® PFSA dispersion. After evaporation of the dispersion solvents, an electrode structure was formed in which $RuO_2$ particles in intimate electrical contact with one another were embedded in a solid ionomer matrix, with the matrix providing a connective path for proton ionic transport throughout the structure and the $RuO_2$ particles providing a continuous electron path throughout the structure.

The thus-prepared cathode was pressed onto one side of a NAFION® PFSA membrane, and a tantalum oxide coated disk similar to that described in Example 1 was pressed onto the opposite side of the NAFION® PFSA membrane. The two electrodes and the NAFION® PFSA membrane were then placed between titanium sheet current collector frames. The capacitor was then charged to 125 volts and discharged across a 48 ohm resistor.

Figure 6:
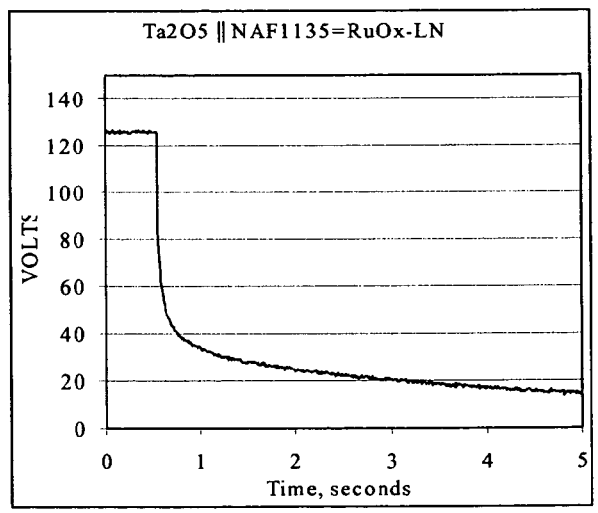
FIG. 6 is a graph representing the discharge curve for the electrochemical-electrolytic capacitor of Example 2.

The resulting discharge curve is shown in FIG. 6. As can be seen by comparing the discharge curves of FIGS. 5 and 6, the capacitor of Example 2 exhibited an improvement over that of Example 1.

EXAMPLE 3

A third electrochemical-electrolytic capacitor was constructed, this third electrochemical-electrolytic capacitor differing from the electrochemical-electrolytic capacitor of Example 2 in that a different anode was used and in that the NAFION® PFSA membrane was omitted. More specifically, the anode was formed as follows: tantalum powder (H.C. Starck NA30KN) was pressed into a pellet at a pressure of approximately 3000 psi. The pellet was then heated at 1550° C. for 20 minutes under vacuum conditions to fuse the tantalum particles together into a porous disk. The fused particles were then placed in a solution of 50% ethylene glycol and 0.1% $H_3PO_4$ and anodized at 150 V for 24 hours at 85° C. to form a $Ta_2O_5$ coating on the tantalum particles of the porous disk. The disk structure was then filled with a solubilized form of sulfonated polyphenylene oxide (SPPO).

Several different techniques were used to fill the porous disk structure with SPPO. Such techniques included vacuum methods and spraying or spreading SPPO solution onto heated substrates. Heat decreased the viscosity of the solution and allowed the solution to be drawn into the structure by capillary action. Other disks were filled by casting a layer of SPPO solution over the disk in a shallow TEFLON® polytetrafluoroethylene form in order to fill the porous structure and to form a top layer in one step. Vacuum de-aeration was also used in some of these cast-filled samples. The cast samples were also dried more slowly over two days or more, having been covered the first night. Slow drying while covered produced better results in casting solid ionomer films. Slow drying resulted in more uniform films with fewer bubbles and defects. An acid etching solution was used on some samples as a way to enhance porosity before filling with SPPO. Disks were immersed in a solution of concentrated acetic, nitric and hydrofluoric acids for durations ranging from 12 minutes up to 8 hours.

Figure 7:
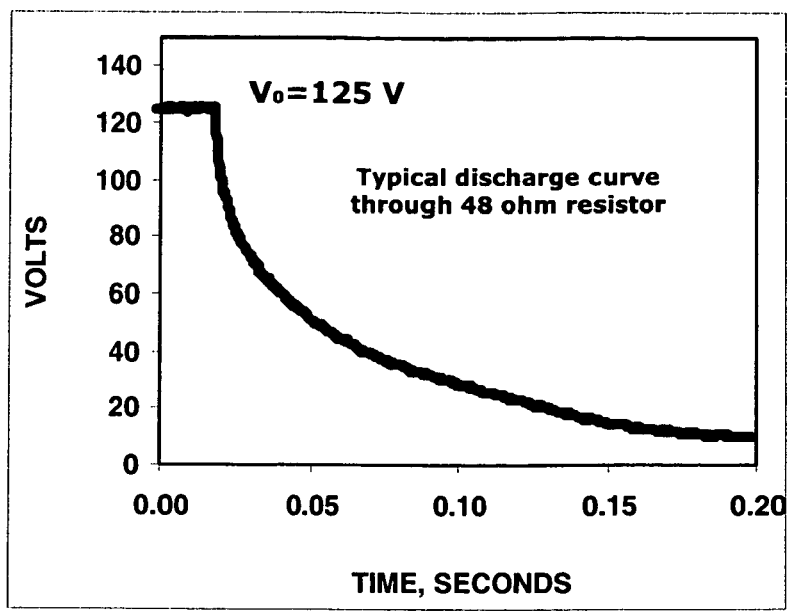
FIG. 7 is a graph representing the discharge curve for the electrochemical-electrolytic capacitor of Example 3.

The anode as described above and a cathode as described in Example 2 were pressed together to form a complete capacitor (the electrically conductive components of the cathode and the anode being separated by extended layers of SPPO dielectric deposited on the inside surfaces of the anode, as well as on the cathode). The capacitor was charged to 125 V and discharged through a 48 ohm resistor. As can be seen by comparing FIG. 7 to FIGS. 5 and 6, the capacitor of Example 3 exhibited a substantial improvement over the capacitors of Examples 1 and 2. As compared, for example, to the electrochemical-electrolytic capacitor of Example 1, which had a capacitance of 2 microFarads/cm², the capacitor of Example 3 had a capacitance of 148 microFarads/cm².

Without wishing to be limited to any particular theory behind the invention, the inventors believe that the increased capacitance of the high-voltage electrochemical-electrolytic capacitor of Example 3 is at least partially attributable to the fact that, in the capacitors of Examples 1 and 2, the solid ionomer contacts only the inwardly facing surface of the porous disk whereas, in the capacitor of Example 3, the solid ionomer penetrates the porous disk and, therefore, contacts and creates a much greater electrochemical/electrolytic active surface area of the porous disk. In addition, in the capacitor of Example 1, the solid ionomer contacts only the inwardly facing surface of the $RuO_2$ electrode whereas, in the capacitor of Examples 2 and 3, the solid ionomer penetrates the $RuO_2$ electrode structure.

EXAMPLE 4

Figure 8:
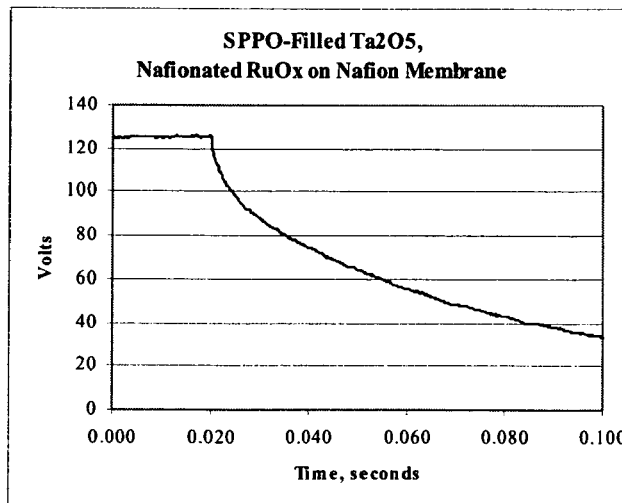
FIG. 8 is a graph representing the discharge curve for the electrochemical-electrolytic capacitor of Example 4.

A fourth electrochemical-electrolytic capacitor was constructed, this fourth capacitor differing from the capacitor of Example 3 in that a different cathode was created. More specifically, the cathode of this example was prepared as follows: $RuO_2$ particles were suspended and dispersed in a solution of SPPO to form a paint. This paint was then sprayed directly onto a titanium plate. Several thin coatings of the paint were used to increase the loading of the oxide while also avoiding mud-flat cracking of the coated deposit. After thorough drying of the coating, a high-voltage capacitor similar to that of Example 3 was assembled and tested. The resulting discharge curve is shown in FIG. 8.

It should be noted that, in the present example, the ruthenium oxide particles were produced using $Ru(OC_2H_5)_3$ as a precursor. This is in contrast with the ruthenium oxide particles of the previous examples, which used $RuCl_3$ as a precursor. Because $RuCl_3$ can be thermally decomposed at temperatures above 300° C., the ruthenium oxide particulate is usually grown at high temperatures, such as 300° C.-500°. At such high temperatures, crystalline ruthenium oxide film is formed. By contrast, $Ru(OC_2H_5)_3$ can be thermally decomposed at temperatures as low as 100° C. At such a low temperature, amorphous ruthenium oxide is formed. The major advantage of amorphous ruthenium oxide is that its specific capacitance and durability is much higher than that for crystalline ruthenium oxide.

EXAMPLE 5

A fifth electrochemical-electrolytic capacitor was constructed, this fifth capacitor differing from the capacitor of Example 3 in that pore formers were used in the formation of the porous tantalum oxide-coated disk in an effort to improve the ability of the solid ionomer to access as much of the $Ta_2O_5$ surface as possible. Ammonium hydrogen carbonate (AHC) was used as a pore former (i) because of its low decomposition temperature and (ii) because it is a powder which can be further crushed and sieved to finer dimensions. Using a set of sieves, batches of AHC were prepared with particle sizes of 100 μm and 100-200 μm. $Ta_2O_5$ coated disks were made with porosities of 20%, 25% and 34%. Initial test results showed no improvement in capacitance for the pore-formed disks compared with similar disks made without pore-formers. It was determined that, to achieve an improvement in capacitance due to pore structure, the average pore diameter would need to be reduced to less than about 0.5 μm. Improved power density results when the pore size is thus optimized.

EXAMPLE 6

Figure 9:
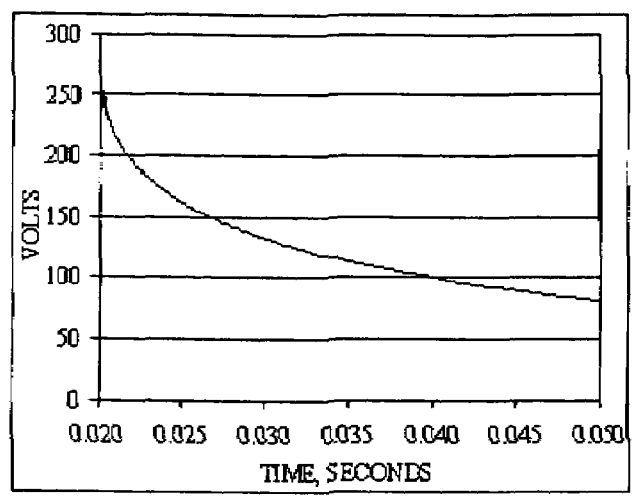
FIG. 9 is a graph representing the discharge curve for the 2-cell electrochemical-electrolytic capacitor stack of Example 6.
Figure 10:
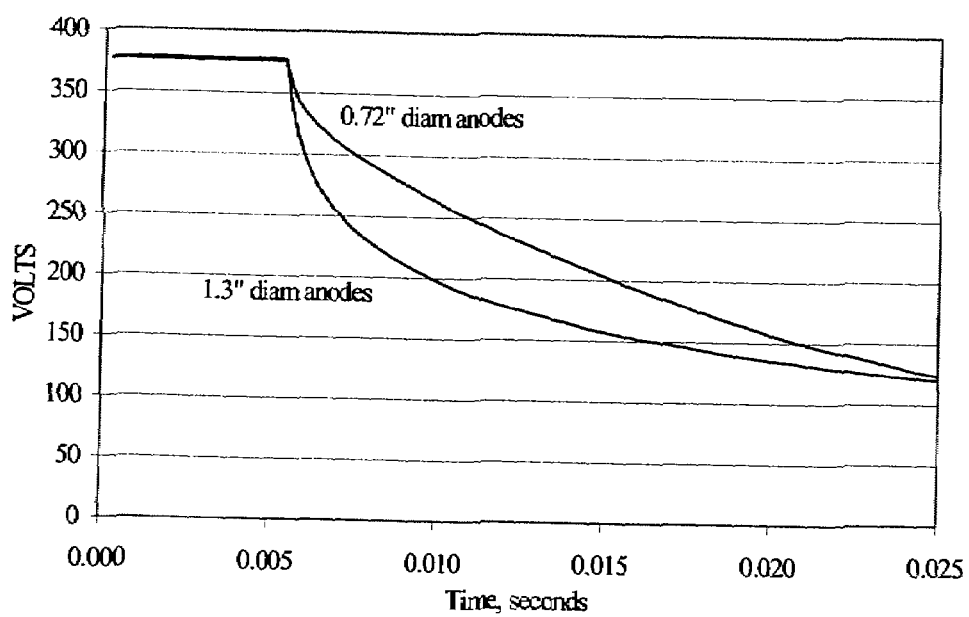
FIG. 10 is a graph representing the discharge curves for the two 3-cell electrochemical-electrolytic capacitor stacks of Example 6.

Multi-cell bipolar high-voltage electrochemical-electrolytic capacitor stacks of two, three, four and five cells were assembled and successfully tested at 250 V, 375 V, 500 V and 600 V, respectively. Each stack consisted of individual cells that were held together in a fixture, with individual cells being able to be added to the stack to increase stack voltage. The individual cells were assembled as described in Example 4. The discharge curve for the two-cell stack is shown in FIG. 9. FIG. 10 shows the discharge curve of two 3-cell stacks discharged through a 48 ohm load resistor after charging to 375 V. The first stack was made from 3.30 cm diameter, 0.23 cm thick anode disks. The other stack was made from 1.83 cm diameter, 0.51 cm thick anode disks. With the smaller anodes, the volume of the stack was reduced from 12.5 cm³ to 8.2 cm³ while capacitance and energy density significantly improved.

Figure 11:
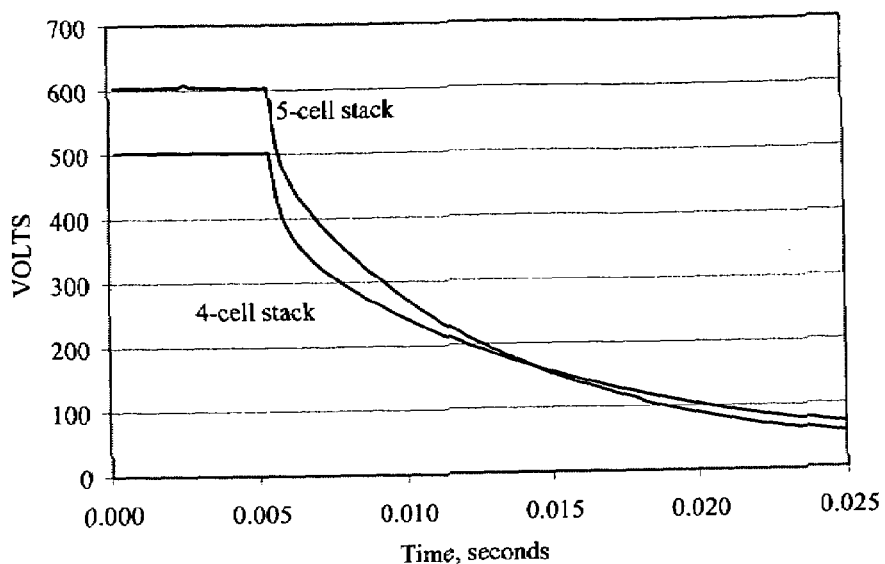
FIG. 11 is a graph representing the discharge curves for the 4-cell and 5-cell electrochemical-electrolytic capacitor stacks of Example 6.

FIG. 11 displays the discharge curves for 4-cell and 5-cell stacks made from smaller diameter anode disks. The thickness of these anode disks was decreased to 0.34 cm and the package diameter was also decreased from 2.24 cm to 2.08 cm, which allowed the 4-cell stack to have a smaller total volume than the previous 3-cell stack.

EXAMPLE 7

Figure 12:
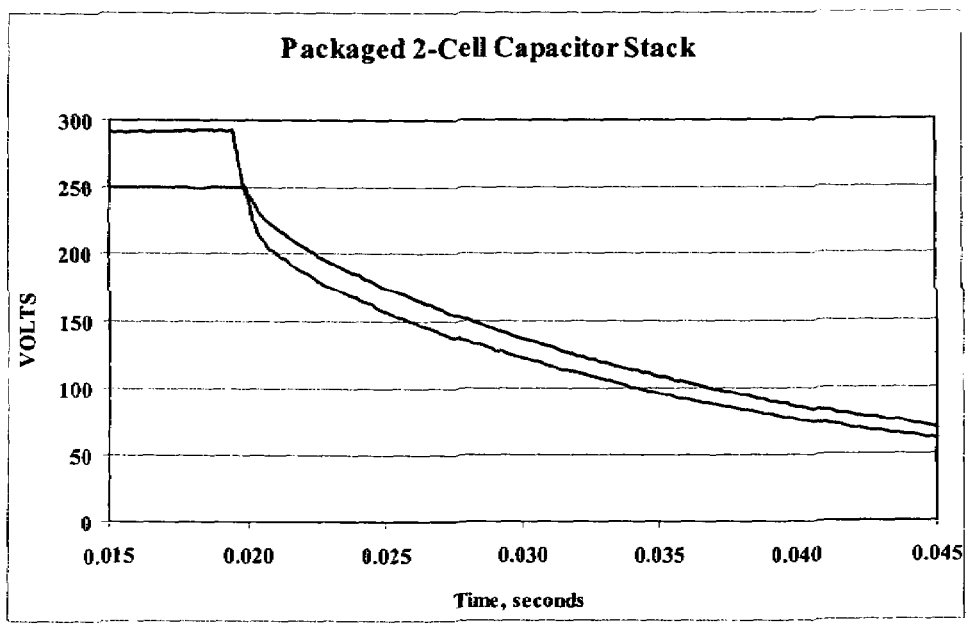
FIG. 12 is a graph representing the discharge curves for the 2-cell electrochemical-electrolytic capacitor stack of Example 7.

A unitized 2-cell high-voltage electrochemical-electrolytic capacitor stack was fabricated by connecting in series two individual cells of the type described in Example 4. Electrical contact was made between the two cells by means of a conductive epoxy. The 2-cell stack was charged to 250 V and discharged across a 48 ohm resistor. The discharge curve is shown in FIG. 12. This stack was then charged to 290 V and discharged across a 48 ohm resistor, the results also being shown in FIG. 12. Table I compares some of the stack characteristics for discharging from both 250 V and 290 V. In both cases, the stack time constant (RC) and overall capacitance were the same. The stack energy density (J/cm³) increased when discharging from the higher voltage. This increase was observed when calculating the stack volume based on a packaged stack and based on the dimensions of the active components.

TABLE I

| Initial Voltage | Stack Characteristics | | | Actual Volume | Components Only |
|---|---|---|---|---|---|
| $V_{CHG}$ (Volts) | CAPACITANCE (mF) | LOAD (Ohms) | RC (Sec) | Energy (J/cm³) | Energy (J/cm³) |
| 250 | 0.379 | 48 | 0.0182 | 2.09 | 5.73 |
| 290 | 0.375 | 48 | 0.0180 | 2.78 | 7.62 |

EXAMPLE 8

A high-voltage electrochemical-electrolytic capacitor like capacitor 11 was assembled, the anode being prepared as follows: First, a titanium foil was spot-welded to a tantalum foil to form a single unitized structure. Next, a layer of ionomer-coated $Ta_2O_5$ particulate (a tantalum wire was imbedded into the $Ta_2O_5$ particulate layer for current collection) was formed onto the tantalum foil. The electrical resistance was then measured between the tantalum contact wire and the titanium foil, with a value of 0.01 ohm being observed. This value is insignificant as compared to the typical 0.4 to 0.6 ohm resistance value for a single cell electrochemical-electrolytic capacitor.

EXAMPLE 9

Two anode pellets were prepared, each of the pellets being formed by pressing together 5.4 g of tantalum powder (H.C. Starck NA30KN) at a pressure of approximately 3,000 psi to a set thickness in the pellet die of 0.36 cm. A 0.05 cm Ta wire was pressed into each pellet for contact in the $Ta_2O_5$ formation. The pressed pellets were sintered in a vacuum furnace at 1550° C. for 20 minutes. After sintering, the dimensions of each pellet were approximately 1.83 cm diameter and 0.34 cm thick. Tantalum foil disks, each 0.03 cm thick and 2.22 cm in diameter and serving as the bipolar plates in the capacitor stack, were cleaned in acetone and bottom surface spot welded to one side of each of the pellets. $Ta_2O_5$ formation was performed in 50% ethylene glycol+ 0.1% $H_3PO_4$ at 85° C. The voltage limit was set to 150 V. The current limit was set to a total of 350 mA for the two disks in parallel. The total formation time was 18 hours. After $Ta_2O_5$ formation, the disks were thoroughly rinsed in distilled water, boiled, rinsed three times, and then dried in an 110° C. oven for 24 hours. The top surface of the tantalum bipolar plates were abraded with a wire wheel and sandpaper to remove the oxide layer. $RuO_2$-10% SPPO (sulfonated-2, 6-dimethyl polyphenylene oxide) was applied to the bottom surface of the bipolar disk of one $Ta_2O_5$ formed anode and to another 2.22 cm diameter, 0.03 cm thick Ta foil disk, which represented the cathode end plate. The anode pellets were then filled with SPPO solid electrolyte by repeated applications (10 total) of 150 μl SPPO solution (in isopropanol), drying 20-30 minutes between applications at 40° C., followed by overnight drying at 40° C. The filling procedure formed an extended SPPO film, 0.03 cm thick on the surface of the anode disks. The cells were then bonded together to form the stack by applying 100 microliters of SPPO solution to the dried SPPO topcoat of each anode disk. After 5 minutes, the disk with the $RuO_2$ on the bipolar element was placed on top of the first anode and the $RuO_2$—Ta end disk placed faced-down on top. The stack was assembled in a fixture to hold the alignment and a weight was placed on top to apply pressure for 30 minutes. The weight was then removed and the stack placed in a 40° C. oven to dry overnight. The stack was then placed in distilled, de-ionized water to hydrate the SPPO. The resistance between the contact wire and the oxidized Ta disk was measured and found to be 0.010 ohm.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A method of making an electrochemical-electrolytic capacitor, said method comprising the steps of:
    (a) preparing an electrochemical capacitor cathode-containing portion, said electrochemical capacitor cathode-containing portion comprising a plurality of electrically-conductive cathode particles in intimate electrical contact with one another and disposed in a first solid ionomer matrix, said first solid ionomer matrix being a proton-conductive, electrically-non-conductive, unitary structure, said first solid ionomer matrix having a volume that extends, on one side, beyond said electrically-conductive cathode particles and is devoid of said electrically-conductive cathode particles;
    (b) preparing an electrolytic capacitor anode-containing portion, said electrolytic capacitor anode-containing portion comprising a plurality of electrically-conductive anode particles in intimate electrical contact with one another and disposed in a second solid ionomer matrix, said second solid ionomer matrix being a proton-conductive, electrically-non-conductive, unitary structure, said electrically-conductive anode particles differing in composition from said electrically-conductive cathode particles, said second solid ionomer matrix having a volume that extends, on one side, beyond said electrically-conductive anode particles and is devoid of said electrically-conductive anode particles; and
    (c) then, bringing said electrochemical capacitor cathode-containing portion and said electrolytic capacitor anode-containing portion together so that said volume of said first solid ionomer matrix and said volume of said second ionomer matrix together form a dielectric layer between said electrically-conductive cathode particles and said electrically-conductive anode particles.

2. The method as claimed in claim 1 wherein said electrically-conductive cathode particles comprise a metal oxide.

3. The method as claimed in claim 2 wherein said metal oxide is a noble metal oxide.

4. The method as claimed in claim 3 wherein said noble metal oxide is selected from the group consisting of ruthenium oxide, iridium oxide, rhodium oxide and osmium oxide.

5. The method as claimed in claim 4 wherein said electrically-conductive cathode particles are made of ruthenium oxide.

6. The method as claimed in claim 5 wherein said electrically-conductive cathode particles have an amorphous configuration.

7. The method as claimed in claim 1 wherein said electrically-conductive cathode particles are aggregated in a plurality of layers.

8. The method as claimed in claim 1 wherein said first solid ionomer matrix comprises a non-perfluorinated sulfonated ionomer.

9. The method as claimed in claim 8 wherein said non-perfluorinated sulfonated ionomer is selected from the group consisting of sulfonated-2,6-dimethyl polyphenylene oxide; sulfonated- (or phosphonated-)2,6-diphenyl polyphenylene oxide; polysulfone; polyethersulfone; polybenzimidazole; polyimide; polystyrene; polyethylene; polytrifluorostyrene; polyetheretherketone and liquid crystal polymers.

10. The method as claimed in claim 9 wherein said non-perfluorinated sulfonated ionomer is sulfonated-2,6-dimethyl polyphenylene oxide.

11. The method as claimed in claim 1 wherein said electrically-conductive anode particles comprise a valve metal.

12. The method as claimed in claim 1 wherein said electrically-conductive anode particles comprise an inner core and an outer coating, said inner core comprising a valve metal, said outer coating comprising a valve metal oxide.

13. The method as claimed in claim 12 wherein said inner core is tantalum and said outer coating is tantalum oxide.

14. The method as claimed in claim 13 wherein said electrically-conductive anode particles are fused together to form a porous pellet.

15. The method as claimed in claim 14 wherein said porous pellet comprises a plurality of particle layers.

16. The method as claimed in claim 1 wherein said second solid ionomer matrix comprises a non-perfluorinated sulfonated ionomer.

17. The method as claimed in claim 16 wherein said non-perfluorinated sulfonated ionomer is selected from the group consisting of sulfonated-2,6-dimethyl polyphenylene oxide; sulfonated- (or phosphonated-)2,6-diphenyl polyphenylene oxide; polysulfone; polyethersulfone; polybenzimidazole; polyimide; polystyrene; polyethylene; polytrifluorostyrene; polyetheretherketone and liquid crystal polymers.

18. The method as claimed in claim 17 wherein said non-perfluorinated sulfonated ionomer is sulfonated-2,6-dimethyl polyphenylene oxide.

19. The method as claimed in claim 17 wherein each of said first and second solid ionomer matrix comprises a non-perfluorinated sulfonated ionomer.

20. The method as claimed in claim 1 wherein said first and second solid ionomer matrices are identical in composition.

21. The method as claimed in claim 1 further comprising, prior to step (c), applying a quantity of a solid ionomer solution to at least one of said first solid ionomer matrix and said second solid ionomer matrix to promote adhesion between said first and second solid ionomer matrices.

22. The method as claimed in claim 1 wherein said step of preparing said electrolytic capacitor anode-containing portion comprises providing a valve metal in powdered form and pressing the powder to produce a porous pellet, sintering the porous pellet, electrochemically activating the sintered porous pellet, applying a solution of a solid ionomer to the sintered porous pellet in a quantity sufficient to suffuse the sintered porous pellet and to form an additional thickness of solid ionomer on one side of the sintered porous pellet, and then drying off the solvent of the solid ionomer solution.

23. The method as claimed in claim 22 wherein said step of preparing said electrochemical capacitor cathode-containing portion comprises adding a solution of a solid ionomer to a plurality of electrically-conductive cathode particles in intimate electrical contact with one another in a quantity sufficient to suffuse the electrically-conductive cathode particles and to form an additional thickness of solid ionomer on one side of the electrically-conductive cathode particles, and then drying off the solvent of the solid ionomer solution.

24. The method as claimed in claim 1 wherein said step of preparing said electrochemical capacitor cathode-containing portion comprises adding a solution of a solid ionomer to a plurality of electrically-conductive cathode particles in intimate electrical contact with one another in a quantity sufficient to suffuse the electrically-conductive cathode particles and to form an additional thickness of solid ionomer on one side of the electrically-conductive cathode particles, and then drying off the solvent of the solid ionomer solution.

25. The method as claimed in claim 1 further comprising the steps of placing a first current collector in intimate electrical contact with said an electrochemical capacitor cathode-containing portion and placing a second current collector in intimate electrical contact with said electrolytic capacitor anode-containing portion.

26. The method as claimed in claim 25 wherein each of said first and second current collectors comprises a valve metal foil.

27. The method as claimed in claim 26 wherein said first current collector further comprises a thin or non-oxidized valve metal coating facing said electrochemical capacitor cathode-containing portion.

28. The method as claimed in claim 26 wherein said second current collector further comprises, on said valve metal foil, a coating facing said electrolytic capacitor anode-containing portion, said coating comprising a valve metal oxide.

29. The method as claimed in claim 1 wherein said step of preparing said electrochemical capacitor cathode-containing portion comprises providing a paint comprising said electrically-conductive cathode particles dispersed in a solution of a solid ionomer, applying at least one coating of said paint to a current collector, and then drying off the solvent of the solid ionomer solution.

30. A electrochemical-electrolytic capacitor made by the method of claim 1.

31. A method of making an electrochemical-electrolytic capacitor, said method comprising the steps of:
  (a) preparing an electrolytic capacitor anode-containing portion, said electrolytic capacitor anode-containing portion comprising a plurality of electrically-conductive anode particles in intimate electrical contact with one another and disposed in a solid ionomer matrix, said solid ionomer matrix being a proton-conductive, electrically-non-conductive, unitary structure, said solid ionomer matrix having a volume that extends, on one side, beyond said electrically-conductive anode particles and is devoid of said electrically-conductive anode particles;
  (b) providing a paint comprising a plurality of electrically-conductive cathode particles dispersed in a solid ionomer solution, said electrically-conductive cathode particles differing in composition from said electrically-conductive anode particles;
  (c) applying at least one coating of said paint to said solid ionomer matrix over said extended volume; and
  (d) then, drying off the solvent of said solid ionomer solution.

32. The method as claimed in claim 31 wherein said step of preparing said electrolytic capacitor anode-containing portion comprises providing a valve metal in powdered form and pressing the powder to produce a porous pellet, sintering the porous pellet, electrochemically activating the sintered porous pellet, applying a solution of a solid ionomer to the sintered porous pellet in a quantity sufficient to suffuse the sintered porous pellet and to form an additional thickness of solid ionomer on one side of the sintered porous pellet, and then drying off the solvent of the solid ionomer solution.

33. The method as claimed in claim 32 wherein said electrically-conductive anode particles comprise a valve metal.

34. The method as claimed in claim 31 wherein said electrically-conductive anode particles comprise an inner core and an outer coating, said inner core comprising a valve metal, said outer coating comprising a valve metal oxide.

35. The method as claimed in claim 34 wherein said inner core is tantalum and said outer coating is tantalum oxide.

36. The method as claimed in claim 31 wherein said electrically-conductive cathode particles comprise a metal oxide.

37. The method as claimed in claim 36 wherein said metal oxide is a noble metal oxide.

38. The method as claimed in claim 37 wherein said noble metal oxide is selected from the group consisting of ruthenium oxide, iridium oxide, rhodium oxide and osmium oxide.

39. The method as claimed in claim 38 wherein said electrically-conductive cathode particles are made of ruthenium oxide.

40. The method as claimed in claim 39 wherein said electrically-conductive cathode particles have an amorphous configuration.

41. The method as claimed in claim 36 wherein said metal oxide comprises a noble metal oxide combined with a valve metal oxide, said noble metal oxide being at least one noble metal oxide selected from the group consisting of ruthenium oxide, iridium oxide, rhodium oxide and osmium oxide.

42. The method as claimed in claim 36 wherein said metal oxide is selected from the group consisting of ruthenium-tantalum oxide, iridium-tantalum oxide and ruthenium-iridium-tantalum oxide.

43. The method as claimed in claim 31 wherein said solid ionomer solution comprises a non-perfluorinated sulfonated ionomer.

44. The method as claimed in claim 43 wherein said non-perfluorinated sulfonated ionomer is selected from the group consisting of sulfonated-2,6-dimethyl polyphenylene oxide; sulfonated- (or phosphonated-)2,6-diphenyl polyphenylene oxide; polysulfone; polyethersulfone; polybenzimidazole; polyimide; polystyrene; polyethylene; polytrifluorostyrene; polyetheretherketone and liquid crystal polymers.

45. The method as claimed in claim 42 wherein said non-perfluorinated sulfonated ionomer is sulfonated-2,6-dimethyl polyphenylene oxide.

46. The method as claimed in claim 31 wherein said solid ionomer solution comprises an anionic solid ionomer.

47. The method as claimed in claim 46 wherein said anionic solid ionomer is an anion exchange ionomer in the hydroxide ion form.

* * * * *